United States Patent
Elyada et al.

(10) Patent No.: US 9,772,764 B2
(45) Date of Patent: Sep. 26, 2017

(54) ACCOMMODATING SENSORS AND TOUCH IN A UNIFIED EXPERIENCE

(71) Applicant: Microsoft Technology Licensing, LLC, Redmond, WA (US)

(72) Inventors: Oded Elyada, Hod Hasharon (IL); Jeffrey M. Jo, Mountain View, CA (US); Shaiket S. Das, Snoqualmie, WA (US); Aditya R. Kalro, Ano Nuevo, CA (US); Zijia Zheng, Bellevue, WA (US); Karen Master Ben-Dor, Kfar-Saba (IL); Adi Diamant, Shoham (IL); Inbal Ort Bengal, Aseret (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 13/911,884

(22) Filed: Jun. 6, 2013

(65) Prior Publication Data
US 2014/0365977 A1    Dec. 11, 2014

(51) Int. Cl.
G06F 3/0488 (2013.01)
G06F 3/0486 (2013.01)
G06F 9/44 (2006.01)

(52) U.S. Cl.
CPC .......... *G06F 3/0488* (2013.01); *G06F 3/0486* (2013.01); *G06F 9/4443* (2013.01)

(58) Field of Classification Search
CPC .................................................. G06F 3/0488
See application file for complete search history.

(56) References Cited

U.S. PATENT DOCUMENTS

| 8,228,292 | B1* | 7/2012 | Ruiz et al. ..................... 345/156 |
| 2008/0089613 | A1* | 4/2008 | Cho ....................... G06F 3/0485 382/296 |
| 2009/0304250 | A1* | 12/2009 | McDermott ............. A61B 8/08 382/131 |
| 2010/0007613 | A1* | 1/2010 | Costa ..................... G06F 1/1601 345/173 |
| 2011/0063216 | A1* | 3/2011 | Orr et al. ....................... 345/158 |
| 2011/0109546 | A1* | 5/2011 | Milne et al. .................. 345/158 |
| 2013/0053007 | A1 | 2/2013 | Cosman et al. |
| 2013/0120240 | A1* | 5/2013 | Hong ............................. 345/156 |

(Continued)

OTHER PUBLICATIONS

Scoditti, Adriano, "Gestural Interaction Techniques for Handheld Devices Combining Accelerometers and Multipoint Touch Screens", Published on: Sep. 28, 2011, Available at: http://iihm.imag.fr/publs/2011/21882_SCODITTI_2011_archivage1.pdf.

(Continued)

*Primary Examiner* — Jeanette J Parker (57) ABSTRACT

Automatically alternating between input modes on a computing device based on a usage pattern is provided. A first input mode is initiated for interacting with content displayed on the computing device. An input corresponding to a second input mode on the computing is then detected. A transition is then made from the first input mode to the second input mode on the computing device. Upon the detecting a termination of the input on the displayed content the second input mode, a gradual transition is made from the second input mode to the first input mode based on a current sensor state of the computing device and a threshold.

15 Claims, 11 Drawing Sheets

(56) References Cited

U.S. PATENT DOCUMENTS

| | | | |
|---|---|---|---|
| 2014/0123021 A1* | 5/2014 | Walkin | G06F 9/4443 715/746 |
| 2014/0267235 A1* | 9/2014 | DeJohn | G06F 3/01 345/419 |
| 2015/0220151 A1* | 8/2015 | Violet | G06F 3/04883 715/777 |

OTHER PUBLICATIONS

"Zune HD Input Overview", Published on: Mar. 7, 2011, Available at: http://msdn.microsoft.com/en-us/library/ee515089(v=XNAGameStudio.31).aspx.

"Platformer: Adding Touch Support", Published on: Apr. 12, 2010, Available at: http://msdn.microsoft.com/en-us/library/ee515063(v=xnagamestudio.31).aspx.

"Zune HD XNA Platformer Game", Published on: Sep. 27, 2009, Available at: http://www.allaboutcoding.com/tutorials/cs/zunehd.asp.

"Should you use Both the Accelerometer and the Touchscreen in a Phone/Tablet based Game?", Retrieved on: Apr. 11, 2013, Available at: http://ux.stackexchange.com/questions/21540/should-you-use-both-the-accelerometer-and-the-touchscreen-in-a-phone-tablet-base.

Clinton, "Foodie the Bug for iOS Introduces New Levels and Tap Control", Published on: Jan. 11, 2012, Available at: http://alliosnews.com/2012/01/foodie-the-bug-for-ios-introduces-new-levels-and-tap-control/.

Itterheim, Steffen, "Tutorial: Simple Game Project", Retrieved on: Apr. 11, 2013, Available at: http://www.koboldtouch.couldisplay/KTD/Tutorial%3A+Simple+Game+Project.

U.S. Appl. No. 13/409,495, Elyada, et al., "Controlling Images at Hand-Held Devices", filed Mar. 1, 2012.

U.S. Appl. No. 13/409,443, Elyada, et al., "Controlling Images at Mobiledevices Using Sensors", filed Mar. 1, 2012.

* cited by examiner

MOBILE COMPUTING DEVICE

ACCOMMODATING SENSORS AND TOUCH IN A UNIFIED EXPERIENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In today's online environment, mobile devices, such as smartphones and tablets, are increasingly being utilized to access content (such as advertisements) from various content providers. In order to enhance user input experiences with content, content providers are increasingly developing applications which take advantage of sensor (e.g., accelerometers and compasses) and touch functionality incorporated into mobile devices. For example, providers may enable content to be utilized in a first input mode in which users may touch a displayed image of an advertised product to obtain a more detailed description. Providers may further enable content to be utilized in a second input mode in which users may physically tilt the mobile device as a means of rotating a displayed image on the device screen. Currently however, the providing of the aforementioned input modes suffers from a number of drawbacks. For example, switching from the first input mode to the second input mode may cause undesired jitter on the device display screen, the use of two different input systems (e.g., sensors and touch) may result in unnatural or unexpected swapping and, in some applications, the user may be required to explicitly approve switching between the two different input modes. As a result of the aforementioned drawbacks, the resulting experience may be disorienting and/or cumbersome to the user. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for automatically alternating between input modes on a computing device based on a usage pattern. A first input mode is initiated for interacting with content displayed on the computing device. An input corresponding to a second input mode on the computing is then detected. A transition is then made from the first input mode to the second input mode on the computing device. Upon the detecting a termination of the input on the displayed content the second input mode, a gradual transition is made from the second input mode to the first input mode based on a current sensor state of the computing device and a threshold.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for automatically alternating between input modes on a computing device based on a usage pattern. A first input mode is initiated for interacting with content displayed on the computing device. An input corresponding to a second input mode on the computing is then detected. A transition is then made from the first input mode to the second input mode on the computing device. Upon the detecting a termination of the input on the displayed content the second input mode, a gradual transition is made from the second input mode to the first input mode based on a current sensor state of the computing device.

In accordance with one embodiment, the content displayed on the computing device may comprise an advertisement. Once a user stops using the second input mode, the advertisement may stay in its current position up until the first input mode is used, until a certain threshold has been reached. For example, in an automobile advertisement, a user may click on a car door when the user is holding the computing device in a balanced position and turns the automobile with his or her finger. The threshold prevents the automobile from flicking back to a tilt position before the user has an opportunity to click on the door.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
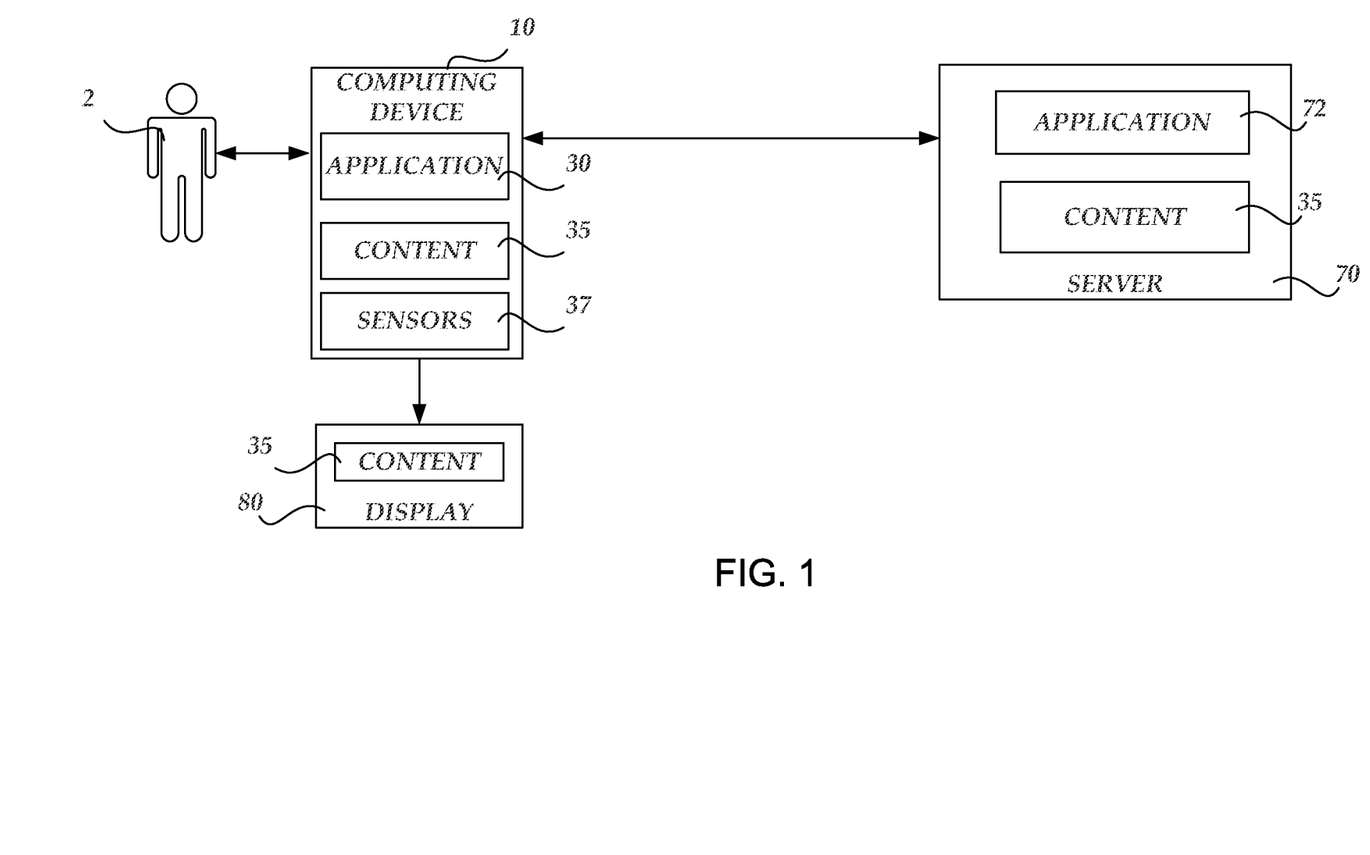
FIG. 1 is a block diagram illustrating a network architecture for automatically alternating between input modes on a computing device based on a usage pattern, in accordance with various embodiments.

Referring now to the drawings, in which like numerals represent like elements through the several figures, various aspects of the present invention will be described. FIG. 1 is a block diagram illustrating a network architecture for automatically alternating between input modes on a computing device based on a usage pattern, in accordance with various embodiments. The network architecture includes a computing device 10 in communication with a server 70. In accordance with an embodiment, the computing device 10 may comprise a mobile computing device (e.g., a tablet, laptop computing device or smartphone) which is utilized by a user 2 for performing various functions. In particular, the computing device 10 may comprise an application 30 which is configured to receive content 35 (which may be created utilizing application 72) from the server 70 for presentation as one or more images on a display 80 (which may comprise a touch screen display). After the content 35 has been received on the computing device 10, the application 30 may be configured to enable the user 2 to utilize sensors 37 on the computing device 10 to interact with the content 35 via a number of input modes. In accordance with an embodiment, the sensors 37 may comprise an accelerometer and a touch sensor. Other types of sensors (e.g., hover, facial recognition, voice, etc.) may also be utilized.

For example, according to one input method and in response to the user 2 tilting the computing device 10, a series of images comprising the content 35 may be displayed according to a current degree of tilt, on the display 80. For instance, the content 35 may comprise a series of images related to different views of an automobile which are indexed according to a predetermined sensor state (e.g., a degree of tilt) of the computing device 10 relative to an axis. Thus, for example, a zero degree tilt of the computing device 10 may result in the display of a front view of the automobile, tilting the computing device 10 between 5 degrees and 15 degrees may result in the display of a right side view of the automobile, tilting the device between 15 degrees and 25 degrees may result in the display of a rear view of the automobile, etc. As further example, according to another input mode, the series of images related to different views of an automobile may also be navigated using touch. For instance, in response to the user 2 dragging a finger across a front view of the automobile on the display 80, the image may transition from a front view to a right side view, a right side view to a rear view, etc. Illustrative techniques for utilizing sensors to control images on computing devices, such as those described above, are disclosed in co-pending U.S. patent application Ser. No. 13/409,443, filed Mar. 1, 2013 and entitled "Controlling Images at Mobile Devices using Sensors" and co-pending U.S. patent application Ser. No. 13/409,495, filed Mar. 1, 2013 and entitled "Controlling Images at Hand-Held Devices." The disclosures of each of the aforementioned applications are incorporated herein, in their entirety, by reference.

In accordance with an embodiment, the application 30 may be configured to automatically alternate between input modes on the computing device 10 based on a usage pattern. The application 30 may comprise part of an advertising platform for utilizing sensors to manipulate images used in advertisements. An illustrative advertising platform which may be utilized with the various embodiments described herein is the AD ROTATOR platform software from MICROSOFT CORPORATION of Redmond, Wash. It should be understood, however, that other types of software (i.e., non-advertising software) from other manufacturers may alternatively be utilized in accordance with the various embodiments described herein.

Figure 2:
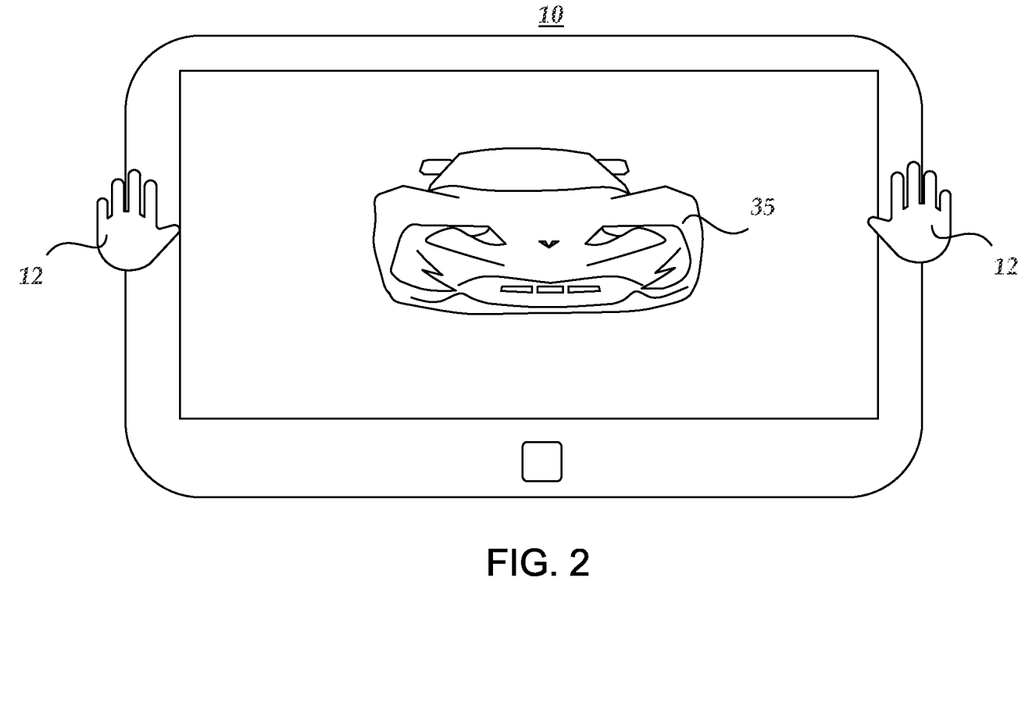
FIG. 2 is a block diagram illustrating displayed content in a first input mode of a computing device, in accordance with an embodiment.

FIG. 2 is a block diagram illustrating displayed content 35 in a first input mode of the computing device 10, in accordance with an embodiment. As shown in FIG. 2, the computing device 10, which is being held by user hands 12, shows a view of the content 35 (i.e., a front view of the image of an automobile) when the computing device 10 is in an initial or first input mode. In accordance with an embodiment, the first input mode may comprise a sensor-based mode in which a rotational sensor (e.g., an accelerometer) within the computing device 10 may be utilized to advance through an index of images in response to tilting the computing device 10 with respect to an axis. For example, and as discussed above with respect to FIG. 1, in the aforementioned input mode, a user 2 may tilt the computing device 10 between five degrees and fifteen degrees, with respect to a horizontal axis, to change the display of the automobile image from a front view to a right side view. It should be understood that the tilt angle of rotation (relative to an axis) may correspond to the aforementioned image index. Thus a degree of tilt of fifteen degrees may correspond to the third image in an image index comprising ten images.

Figure 3:
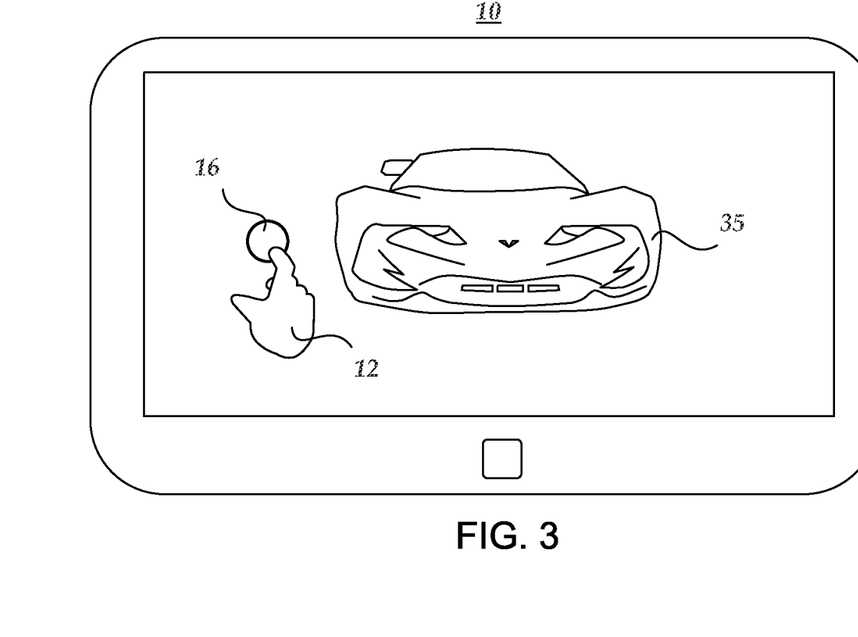
FIG. 3 is a block diagram illustrating the initiation of a transition from a first input mode to a second input mode of a computing device, in accordance with an embodiment.

FIG. 3 is a block diagram illustrating the initiation of a transition from a first input mode to a second input mode of the computing device 10, in accordance with an embodiment. As shown in FIG. 3, contact point 16 has been initiated with the display screen of the computing device 10 via user hand 12, to initiate the transition from the first or previous input mode to the second input mode. In particular, the user 2 may switch from a sensor-based input mode to a touch-based input mode by tapping the display screen while the content 35 is being displayed. As will be described in greater detail below, the initiation of the touch-based mode may cause the sensor-based mode to be "turned off." That is, once the touch-based mode has been initiated and while contact with the display screen is maintained by the user 2, tilting the computing device 10 will have no effect on a currently displayed image.

Figure 4:
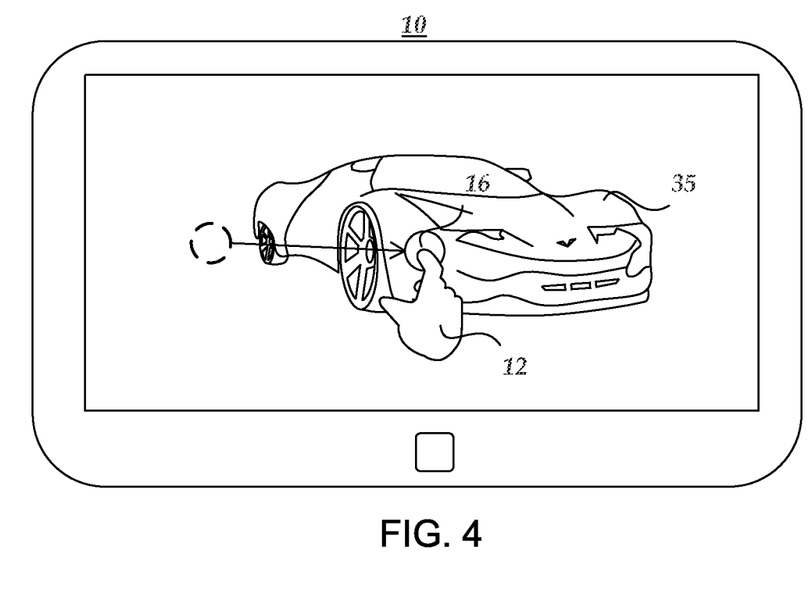
FIG. 4 is a block diagram illustrating displayed content in a second input mode of a computing device, in accordance with an embodiment.

FIG. 4 is a block diagram illustrating displayed content in a second input mode of the computing device 10, in accordance with an embodiment. As shown in FIG. 4, the content 35 being displayed on the computing device 10 is being advanced through an index of images (i.e., rotated) as a result of the user 2 dragging a finger of the hand 12 across the display screen. In particular, and as discussed above with respect to FIG. 1, in the aforementioned input mode, a displayed image may transition from a front view to a right side view, a right side view to a rear view, etc., in response to the user 2 dragging a finger across the display 80.

Figure 5:
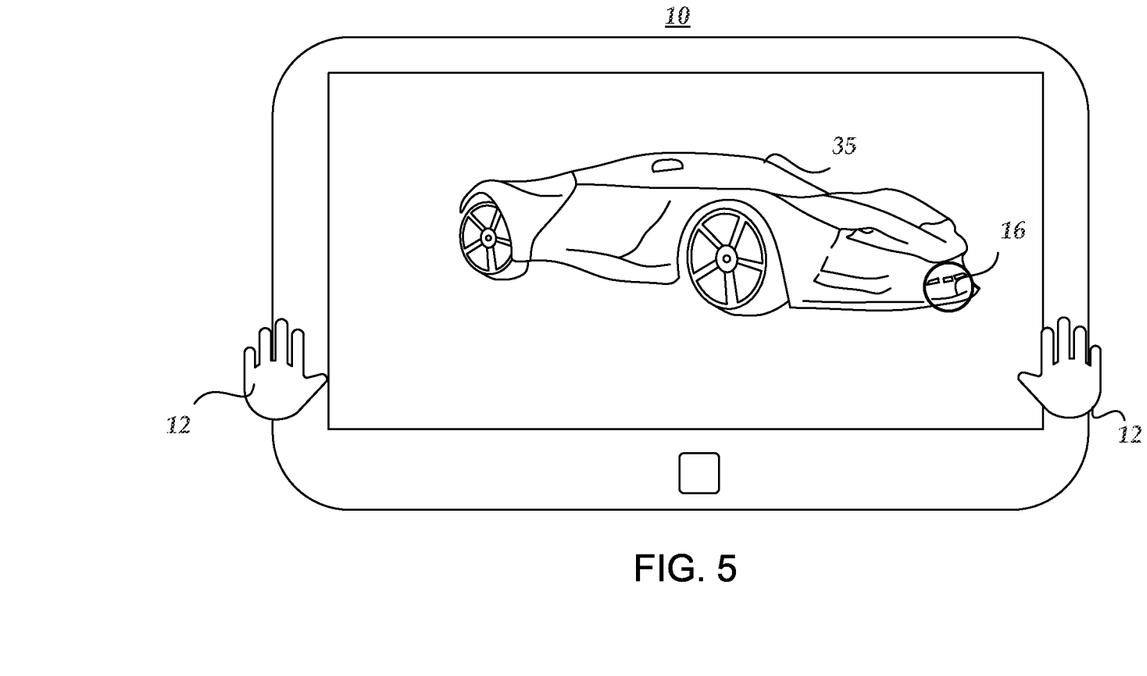
FIG. 5 is a block diagram illustrating the termination of input in a second input mode of a computing device, in accordance with an embodiment.

FIG. 5 is a block diagram illustrating the termination of input in a second input mode of the computing device 10, in accordance with an embodiment. As shown in FIG. 5, the user's hands 12 are released from the contact point 16 such that the user 2 is no longer in contact with the content 35 or any other portion of the display screen of the computing device 10. As will be discussed in greater detail below with respect to FIG. 7, upon the occurrence of a termination of the input in the second input mode, the application 30 executing on the computing device 10 may be configured to gradually transition back to a previous (e.g., sensor-based) input mode based on a stored sensor state (e.g., a stored degree of tilt)

and a current sensor state (e.g., a current degree of tilt) with respect to the computing device 10 (i.e., a threshold). It should be understood that the stored degree of tilt may be relative to the moment the user has stopped touching the display screen.

Figure 6:
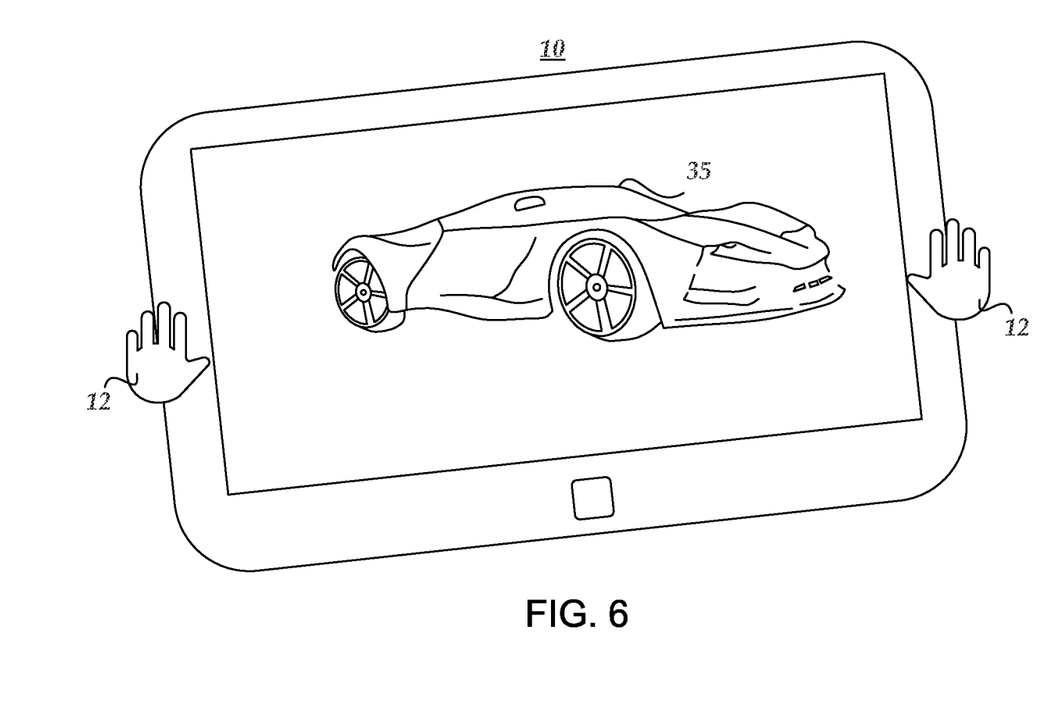
FIG. 6 is a block diagram illustrating the initiation of a transition from a second input mode to a first input mode of a computing device, in accordance with an embodiment.

FIG. 6 is a block diagram illustrating the initiation of a transition from a second input mode to a first input mode of the computing device 10, in accordance with an embodiment. As shown in FIG. 6, the user's hands 12 are shown tilting the computing device 10 while the content 35 is being displayed on the display screen. As will be discussed in greater detail below with respect to FIG. 7, the transition from the second input mode to the first input mode may be based on a stored sensor state (e.g., a degree of tilt upon the release of user contact from the display screen in the second input mode) and a current sensor state with respect to the computing device 10.

Figure 7:
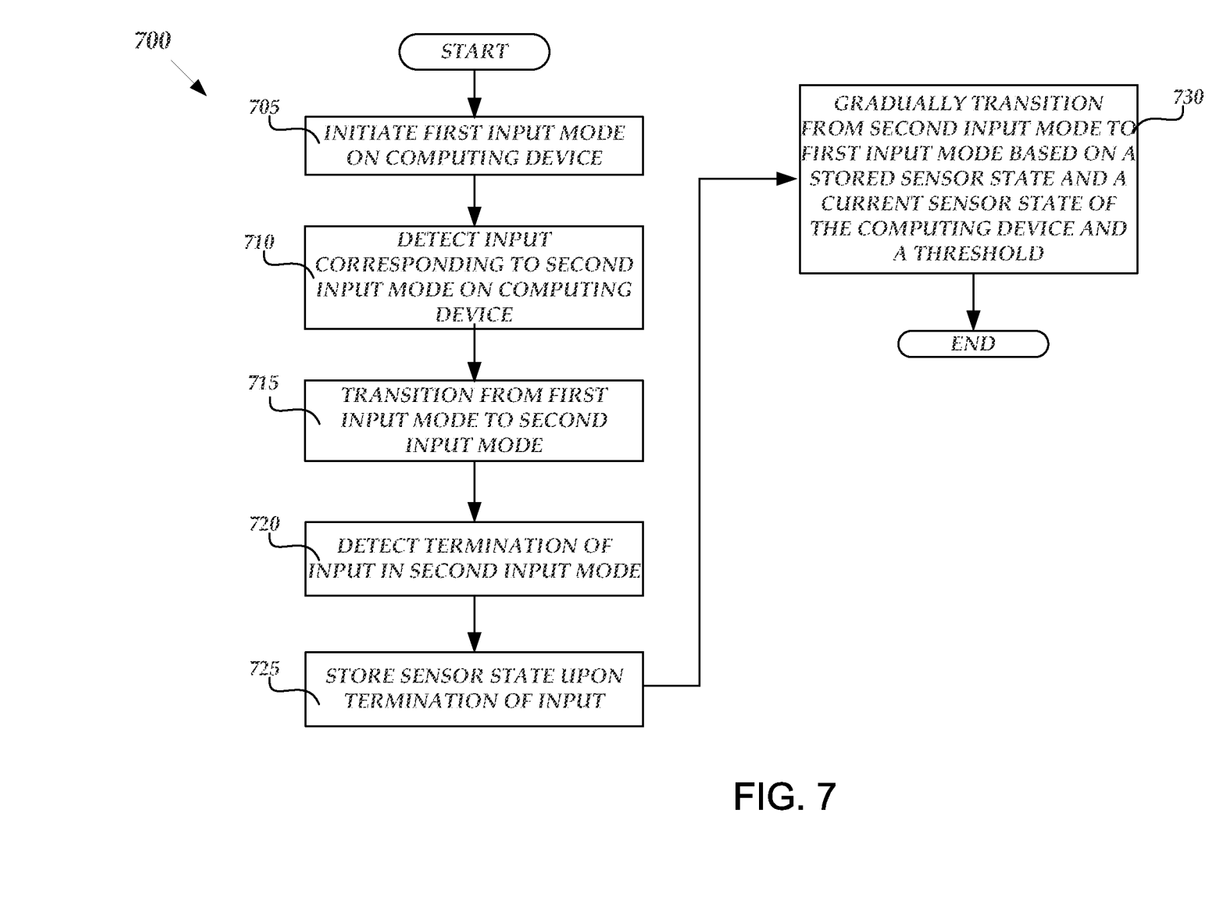
FIG. 7 is a flow diagram illustrating a routine for automatically alternating between input modes on a computing device based on a usage pattern, in accordance with an embodiment.

FIG. 7 is a flow diagram illustrating a routine 700 for automatically alternating between input modes on a computing device based on a usage pattern, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 7 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 700 begins at operation 705, where the application 30, executing on the computing device 10, may initiate a first input mode on the computing device 10. In particular, the application 30 may load the content 35 into a sensor-based mode of the computing device 10. As discussed above, the sensor-based mode may utilize a rotational sensor or accelerometer in the computing device 10 for advancing through an image index based on a degree of tilt with respect to an axis of the computing device 10.

From operation 705, the routine 700 continues to operation 710, where the application 30, executing on the computing device 10, may detect an input corresponding to a second input mode of the computing device 10. In particular, the application 30 may detect a touch input on a display screen of the computing device 10.

From operation 710, the routine 700 continues to operation 715, where the application 30, executing on the computing device 10, may transition from the first input mode to the second input mode. In particular, the application 30 may cause the computing device 10 to transition from the sensor-based mode (which utilizes a rotational sensor or accelerometer for advancing through an image index based on a degree of device tilt with respect to an axis) to a touch-based mode (which utilizes touch (e.g., the dragging of a user's finger across the display 80) to advance through the image index).

From operation 715, the routine 700 continues to operation 720, where the application 30, executing on the computing device 10, may detect a termination of the input in the second input mode of the computing device 10. For example, the termination of the input may be detected in response to the user 2 lifting his or her finger away from the display screen for a predetermined period.

From operation 720, the routine 700 continues to operation 725, where the application 30, executing on the computing device 10, may store a sensor state upon the termination of the input received at operation 710. For example, the application 30, utilizing the sensors 37, may determine and store an angle of tilt of the computing device 10 when the termination of a user's contact with the computing device 10 has been determined at operation 720. Furthermore, while using the computing device in the touch-based mode, the user 2 may naturally tilt the computing device 10 at an angle to facilitate contact with the display 80 (such a situation may occur when the user 2 is holding the computing device 10 while sitting).

From operation 725, the routine 700 continues to operation 730, where the application 30, executing on the computing device 10, may gradually transition from the second input mode to the first input mode based on the stored sensor state (determined at operation 720) and a current sensor state of the computing device 10 (e.g., subsequent tilting of the computing device 10 after a degree of tilt has been stored). That is, the gradual transition may be based on a current sensor state of the computing device 10. In particular, the application 30 may switch from the touch-based input mode to the sensor-based input mode when a difference between a current sensor state and the stored sensor state is greater than a threshold. For example, and in accordance with an embodiment, a tilt threshold may be set to be about 2.5 degrees with respect to a horizontal axis. Thus, in accordance with this embodiment, the gradual transition is initiated when the difference between a current degree of tilt and a stored degree to tilt is ±2.5 degrees with respect to a horizontal axis of the computing device. It should be understood however, that in accordance with the embodiments described herein, the aforementioned threshold may be user-configurable and thus other values may also be utilized. It should be further understood that the gradual transition from the second input mode to the first input mode may be shown by performed by animating the displayed content 35 on the computing device 10. In particular, a currently displayed image may be animated from a current rotation to a rotation indicated by the sensors 37. It should be appreciated that the aforementioned animation also takes into account any tilting of the computing device 10 over the time of the animation. Thus, at the end of the animation, the image is rotated to the exact angle expected by the first input mode (based on a present sensor state of the computing device 10) and the sensors 37 associated with the first input mode (e.g., an accelerometer) may resume full control over the motion of the displayed image within the content 35. From operation 730, the routine 700 then ends.

Figure 8:
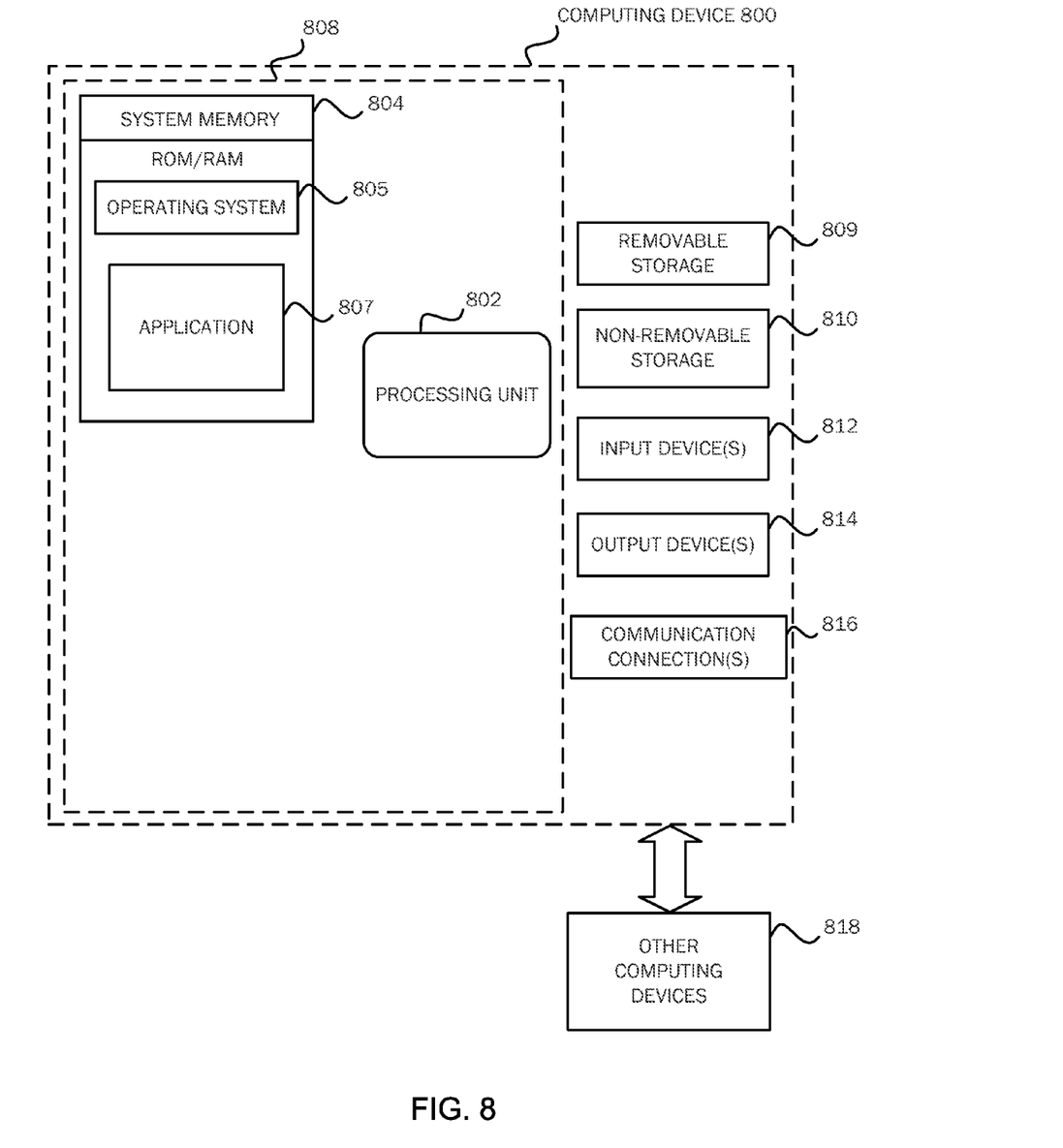
FIG. 8 is a simplified block diagram of a computing device with which various embodiments may be practiced.
Figure 9A:
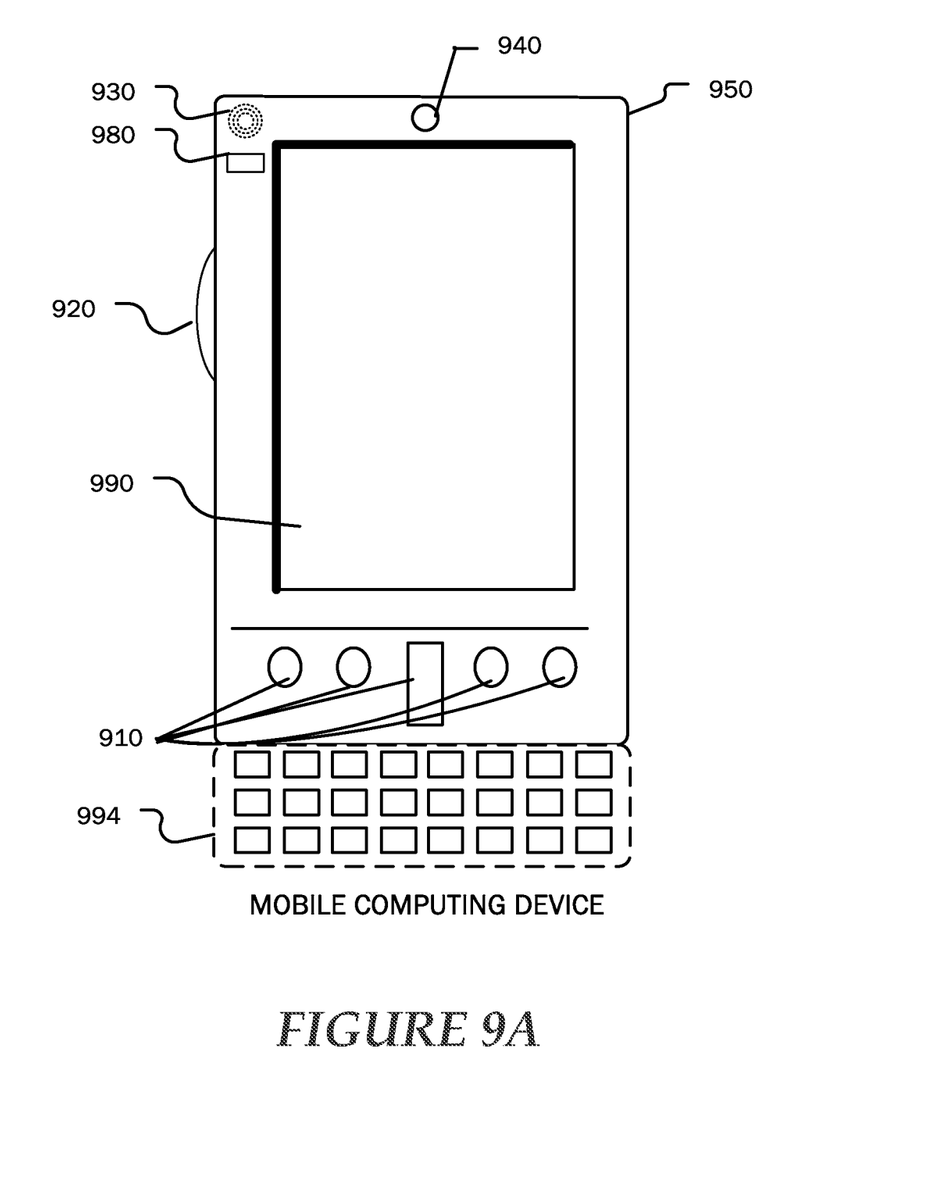
FIG. 9A is a simplified block diagram of a mobile computing device with which various embodiments may be practiced.
Figure 9B:
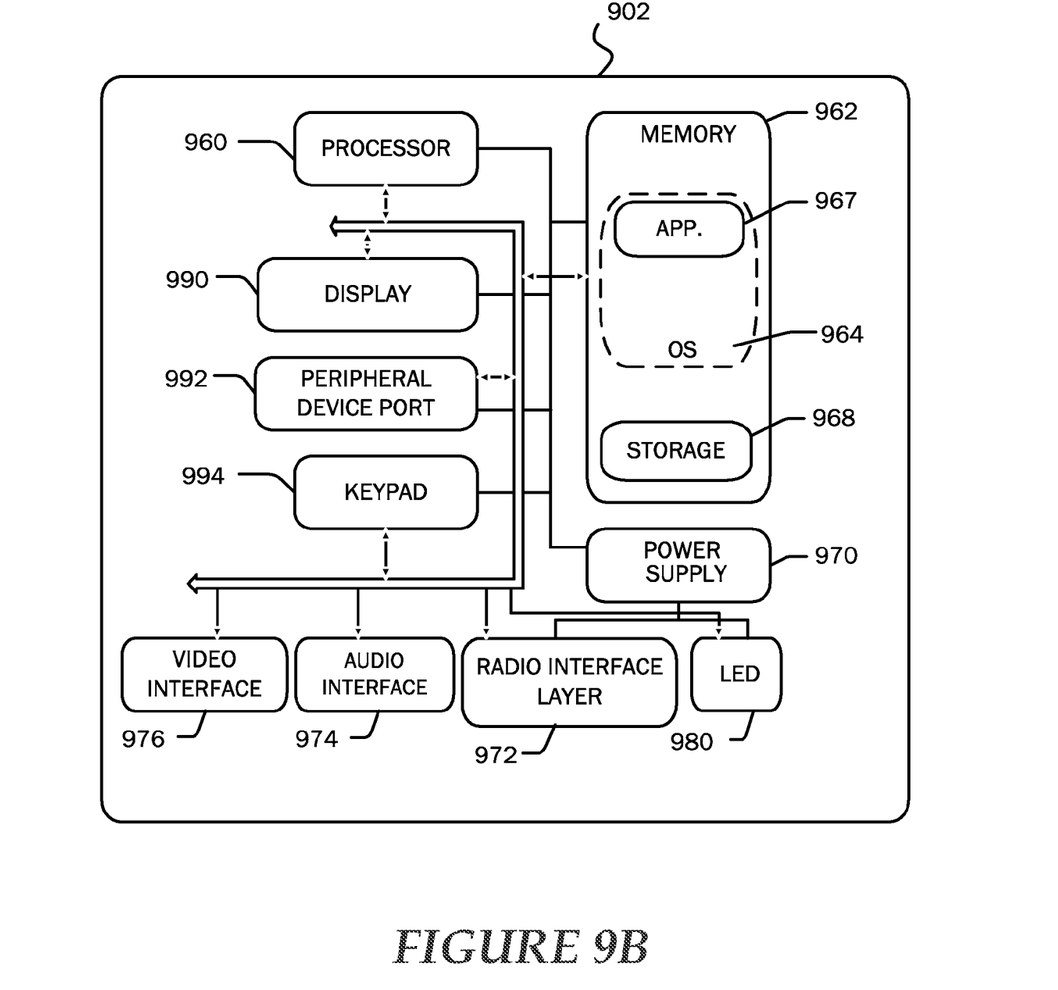
FIG. 9B is a simplified block diagram of a mobile computing device with which various embodiments may be practiced.
Figure 10:
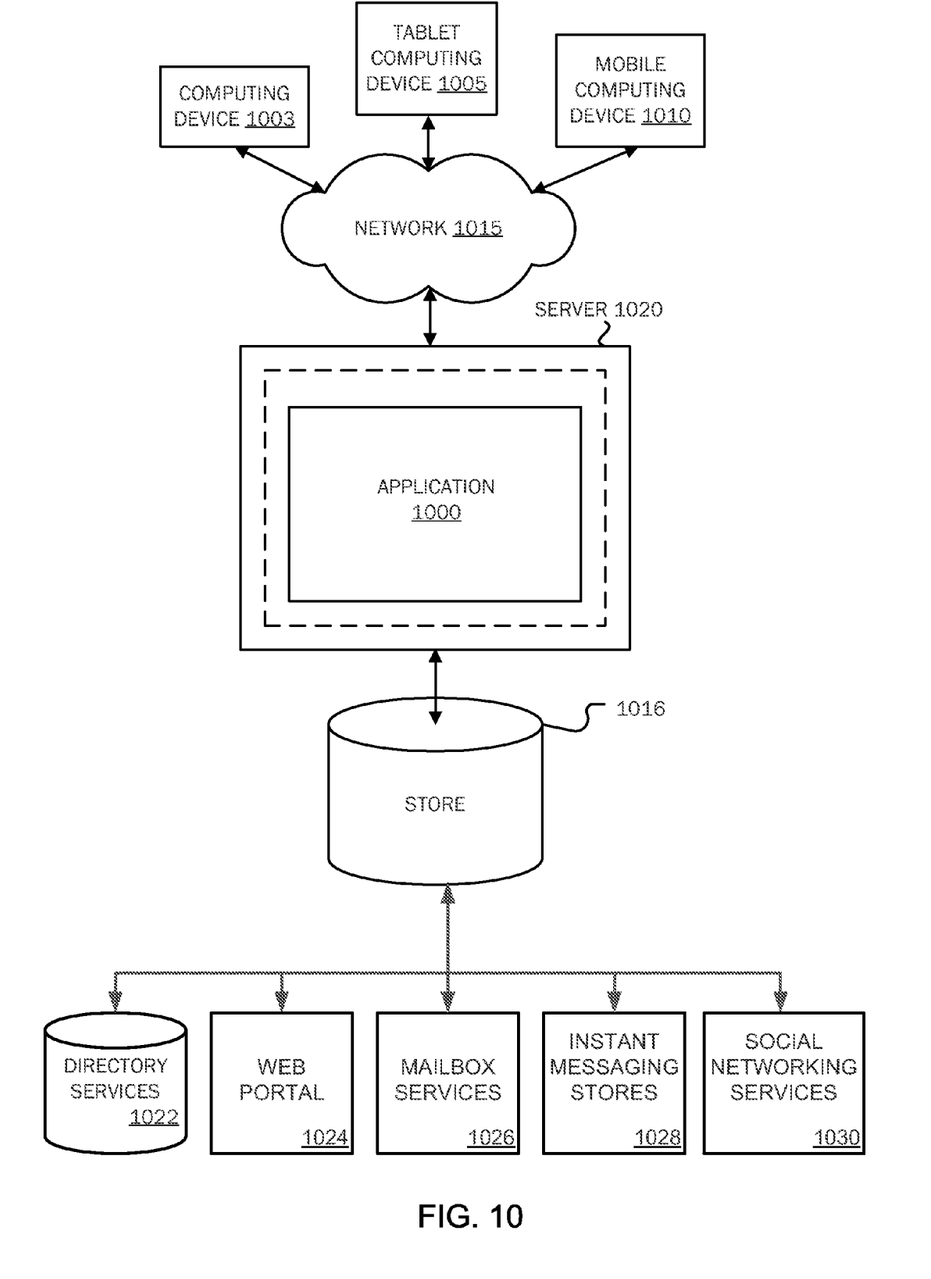
FIG. 10 is a simplified block diagram of a distributed computing system in which various embodiments may be practiced.

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating example physical components of a computing device 800 with which various embodiments may be practiced. In a basic configuration, the computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination. System memory 804 may include an operating system 805 and application 807. Operating system 805, for example, may be suitable for controlling the computing device 800's operation and, in accordance with an embodiment, may comprise the WINDOWS operating systems from MICROSOFT CORPORATION of Redmond, Wash. The application 807, for example, may comprise functionality for performing routines including, for example, automatically alternating between input modes based on a usage pattern, as described above with respect to the operations in routine 700 of FIG. 7. It should be understood, however, that the embodiments described herein may also be practiced in conjunction with other operating systems and application programs and further, is not limited to any particular application or system.

The computing device 800 may have additional features or functionality. For example, the computing device 800 may also include additional data storage devices (removable and/or non-removable) such as, for example, magnetic disks, optical disks, solid state storage devices ("SSD"), flash memory or tape. Such additional storage is illustrated in FIG. 8 by a removable storage 809 and a non-removable storage 810. The computing device 800 may also have input device(s) 812 such as a keyboard, a mouse, a pen, a sound input device (e.g., a microphone), a touch input device for receiving gestures, an accelerometer or rotational sensor, etc. Output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 800 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a suitable mobile computing environment, for example, a mobile computing device 950 which may include, without limitation, a smartphone, a tablet personal computer, a laptop computer, and the like, with which various embodiments may be practiced. With reference to FIG. 9A, an example mobile computing device 950 for implementing the embodiments is illustrated. In a basic configuration, mobile computing device 950 is a handheld computer having both input elements and output elements. Input elements may include touch screen display 925 and input buttons 910 that allow the user to enter information into mobile computing device 950. Mobile computing device 950 may also incorporate an optional side input element 920 allowing further user input. Optional side input element 920 may be a rotary switch, a button, or any other type of manual input element. In alternative embodiments, mobile computing device 950 may incorporate more or less input elements. In yet another alternative embodiment, the mobile computing device is a portable telephone system, such as a cellular phone having display 925 and input buttons 910. Mobile computing device 950 may also include an optional keypad 905. Optional keypad 905 may be a physical keypad or a "soft" keypad generated on the touch screen display.

Mobile computing device 950 incorporates output elements, such as display 925, which can display a graphical user interface (GUI). Other output elements include speaker 930 and LED 980. Additionally, mobile computing device 950 may incorporate a vibration module (not shown), which causes mobile computing device 950 to vibrate to notify the user of an event. In yet another embodiment, mobile computing device 950 may incorporate a headphone jack (not shown) for providing another means of providing output signals.

Although described herein in combination with mobile computing device 950, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 9B is a block diagram illustrating components of a mobile computing device used in one embodiment, such as the mobile computing device 950 shown in FIG. 9A. That is, mobile computing device 950 can incorporate a system 902 to implement some embodiments. For example, system 902 can be used in implementing a "smartphone" that can run one or more applications similar to those of a desktop or notebook computer. In some embodiments, the system 902 is integrated as a computing device, such as an integrated personal digital assistant (PDA) and wireless phone.

Applications 967 may be loaded into memory 962 and run on or in association with an operating system 964. The system 902 also includes non-volatile storage 968 within memory the 962. Non-volatile storage 968 may be used to store persistent information that should not be lost if system 902 is powered down. The applications 967 may use and store information in the non-volatile storage 968. The applications 967 may also include functionality for performing routines including, for example, automatically alternating between input modes based on a usage pattern, as described above with respect to the operations in routine 700 of FIG. 7. A synchronization application (not shown) also resides on system 902 and is programmed to interact with a corresponding synchronization application resident on a host computer to keep the information stored in the non-volatile storage 968 synchronized with corresponding information stored at the host computer. As should be appreciated, other applications may also be loaded into the memory 962 and run on the mobile computing device 950.

The system 902 has a power supply 970, which may be implemented as one or more batteries. The power supply 970 might further include an external power source, such as an AC adapter or a powered docking cradle that supplements or recharges the batteries.

The system 902 may also include a radio 972 (i.e., radio interface layer) that performs the function of transmitting and receiving radio frequency communications. The radio 972 facilitates wireless connectivity between the system 902 and the "outside world," via a communications carrier or service provider. Transmissions to and from the radio 972 are conducted under control of OS 964. In other words, communications received by the radio 972 may be disseminated to the applications 967 via OS 964, and vice versa.

The radio 972 allows the system 902 to communicate with other computing devices, such as over a network. The radio 972 is one example of communication media. The embodiment of the system 902 is shown with two types of notification output devices: the LED 980 that can be used to provide visual notifications and an audio interface 974 that can be used with speaker 930 to provide audio notifications. These devices may be directly coupled to the power supply 970 so that when activated, they remain on for a duration dictated by the notification mechanism even though processor 960 and other components might shut down for conserving battery power. The LED 980 may be programmed to remain on indefinitely until the user takes action to indicate the powered-on status of the device. The audio interface 974 is used to provide audible signals to and receive audible signals from the user. For example, in addition to being coupled to speaker 930, the audio interface 974 may also be coupled to a microphone (not shown) to receive audible (e.g., voice) input, such as to facilitate a telephone conversation. In accordance with embodiments, the microphone may also serve as an audio sensor to facilitate control of notifications. The system 902 may further include a video interface 976 that enables an operation of on-board camera 940 to record still images, video streams, and the like.

A mobile computing device implementing the system 902 may have additional features or functionality. For example, the device may also include additional data storage devices (removable and/or non-removable) such as, magnetic disks, optical disks, or tape. Such additional storage is illustrated in FIG. 9B by storage 968.

Data/information generated or captured by the mobile computing device 950 and stored via the system 902 may be stored locally on the mobile computing device 950, as described above, or the data may be stored on any number of storage media that may be accessed by the device via the radio 972 or via a wired connection between the mobile computing device 950 and a separate computing device associated with the mobile computing device 950, for example, a server computer in a distributed computing network such as the Internet. As should be appreciated such data/information may be accessed via the mobile computing device 950 via the radio 972 or via a distributed computing network. Similarly, such data/information may be readily transferred between computing devices for storage and use according to well-known data/information transfer and storage means, including electronic mail and collaborative data/information sharing systems.

FIG. 10 is a simplified block diagram of a distributed computing system in which various embodiments may be practiced. The distributed computing system may include number of client devices such as a computing device 1003, a tablet computing device 1005 and a mobile computing device 1010. The client devices 1003, 1005 and 1010 may be in communication with a distributed computing network 1015 (e.g., the Internet). A server 1020 is in communication with the client devices 1003, 1005 and 1010 over the network 1015. The server 1020 may store application 1000 which may be perform routines including, for example, automatically alternating between input modes based on a usage pattern, as described above with respect to the operations in routine 700 of FIG. 7. Content developed, interacted with, or edited in association with the application 1000 may be stored in different communication channels or other storage types. For example, various documents may be stored using a directory service 1022, a web portal 1024, a mailbox service 1026, an instant messaging store 1028, or a social networking site 1030.

The application 1000 may use any of these types of systems or the like for enabling data utilization, as described herein. The server 1020 may provide the application 1000 to clients. As one example, the server 1020 may be a web server providing the application 1000 over the web. The server 1020 may provide the application 1000 over the web to clients through the network 1015. By way of example, the computing device 10 may be implemented as the computing device 1003 and embodied in a personal computer, a the tablet computing device 1005 and/or the mobile computing device 1010 (e.g., a smart phone). Any of these embodiments of the computing devices 1003, 1005 and 1010 may obtain content from the store 1016.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. For example, while the above-described embodiments utilize sensor-based and touch-based input modes. Other input modes, including, but not limited to, hover, facial recognition and voice-based input modes may also be utilized.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-readable storage medium storing computer executable instructions which, when executed on a computing device, cause the computing device to perform a method of automatically alternating between input modes based on a usage pattern, the method comprising:
    initiating a sensor-based mode for interacting with a displayed image;
    detecting a touch input on the displayed image;
    in response to detecting the touch input on the displayed image, automatically transitioning from the sensor-based mode to a touch-based mode, wherein the touch-based mode and the sensor-based mode utilize at least one different sensor;
    in response to detecting a termination of the touch input on the displayed image, storing a sensor state of the computing device associated with a first view of the displayed image, wherein the stored sensor state is an angle of tilt of the computing device at the termination of the touch input;
    determining that a current sensor state is different from the stored sensor state; and
    in response to determining that the current sensor state is different from the stored sensor state, gradually transitioning from the touch-based mode to the sensor-based mode based on the stored sensor state and the current sensor state of the computing device, wherein gradually transitioning from the touch-based mode to the sensor-based mode comprises animating the displayed image from the first view associated with the stored sensor state to an expected view associated with the current sensor state based on an image index, wherein the image index includes a plurality of views of the displayed image indexed to a plurality of sensor states.

2. The computer-readable storage medium of claim 1, wherein gradually transitioning from the touch-based mode to the sensor-based mode comprises:
    switching from the touch-based mode to the sensor-based mode when a difference between the sensor state and the stored sensor state is greater than a configurable threshold.

3. The computer-readable storage medium of claim 1, wherein display of each of the plurality of views is determined by the current sensor state, wherein the current sensor state comprises a tilt of the computing device relative to an axis.

4. The computer-readable storage medium of claim 1, wherein the sensor-based mode utilizes an accelerometer.

5. The computer-readable storage medium of claim 1, wherein the touch-based mode utilizes a touch screen.

6. A method of automatically alternating between input modes on a computing device based on a usage pattern, the method comprising:
    initiating a sensor-based mode for interacting with a displayed image;
    detecting a touch input on the displayed image;
    in response to detecting the touch input on the displayed image, automatically transitioning from the sensor-based mode to a touch-based mode, wherein the touch-based mode and the sensor-based mode utilize at least one different sensor;
    in response to detecting a termination of the touch input on the displayed image, storing a sensor state of the computing device associated with a first view of the displayed image, wherein the stored sensor state is an angle of tilt of the computing device at the termination of the touch input;
    determining that a current sensor state is different from the stored sensor state; and
    in response to determining that the current sensor state is different from the stored sensor state, gradually transitioning from the touch-based mode to the sensor-based mode based on the stored sensor state and the current sensor state of the computing device, wherein gradually transitioning from the touch-based mode to the sensor-based mode comprises animating the displayed image from the first view associated with the stored sensor state to an expected view associated with the current sensor state based on an image index, wherein the image index includes a plurality of views of the displayed image indexed to a plurality of sensor states.

7. The method of claim 6, wherein gradually transitioning from the touch-based mode to the sensor-based mode comprises:
    switching from the touch-based mode to the sensor-based mode when a difference between the sensor state and the stored sensor state is greater than a configurable threshold.

8. The method of claim 6, wherein display of each of the plurality of views is determined by the current sensor state, wherein the current sensor state comprises a tilt of the computing device relative to an axis.

9. The method of claim 6, wherein the sensor-based mode utilizes an accelerometer.

10. The method of claim 6, wherein the touch-based mode utilizes a touch screen.

11. A computing device comprising:
a memory for storing executable program code; and
a processor, functionally coupled to the memory, the processor being responsive to computer-executable instructions contained in the program code and operative to:
  initiate a sensor-based mode for interacting with a displayed image;
  detect a touch input on the displayed image;
  in response to detecting the touch input on the displayed image, automatically transitioning from the sensor-based mode to a touch-based mode, wherein the touch-based mode and the sensor-based mode utilize at least one different sensor;
  in response to detecting a termination of the touch input on the displayed image, storing a sensor state of the computing device associated with a first view of the displayed image, wherein the stored sensor state is an angle of tilt of the computing device at the termination of the touch input;
  determine that a current sensor state is different from the stored sensor state; and
  in response to determining that the current sensor state is different from the stored sensor state, gradually transitioning from the touch-based mode to the sensor-based mode based on the stored sensor state and the current sensor state of the computing device, wherein gradually transitioning from the touch-based mode to the sensor-based mode comprises animating the displayed image from the first view associated with the stored sensor state to an expected view associated with the current sensor state based on an image index, wherein the image index includes a plurality of views of the displayed image indexed to a plurality of sensor states.

12. The computing device of claim 11, wherein gradually transitioning from the touch-based mode to the sensor-based mode comprises:
  switching from the touch-based mode to the sensor-based mode when a difference between the sensor state and the stored sensor state is greater than a configurable threshold.

13. The computing device of claim 11, wherein display of each of the plurality of views is determined by the current sensor state, wherein the current sensor state comprises a tilt of the computing device relative to an axis.

14. The computing device of claim 11, wherein the sensor-based mode utilizes an accelerometer.

15. The computing device of claim 11 wherein the touch-based mode utilizes a touch screen.

* * * * *